(12) United States Patent
Lin et al.

(10) Patent No.: US 6,938,468 B1
(45) Date of Patent: Sep. 6, 2005

(54) TIRE PARAMETER SENSING SYSTEM HAVING A MAGNETICALLY CONDUCTIVE RIM AND AN ASSOCIATED METHOD

(75) Inventors: Xing Ping Lin, Orchard Lake, MI (US); Dino Bortolin, La Salle (CA)

(73) Assignees: TRW Automotive U.S. LLC, Farmington Hills, MI (US); Societe de Technologie Michelin, Clermont-Ferrand (FR)

(*) Notice: Subject to any disclaimer, the term of this patent is extended or adjusted under 35 U.S.C. 154(b) by 0 days.

(21) Appl. No.: 10/789,116

(22) Filed: Feb. 27, 2004

(51) Int. Cl.$^7$ .............................................. B60C 23/02
(52) U.S. Cl. ................................................. 73/146.5
(58) Field of Search .......................... 73/146.2, 146.3, 73/146.4, 146.5, 146.8, 146; 340/442–448; 384/446–448

(56) References Cited

U.S. PATENT DOCUMENTS

| | | | |
|---|---|---|---|
| 3,881,170 A | 4/1975 | Hosaka et al. | |
| 3,895,347 A | 7/1975 | Takusagawa et al. | |
| 5,033,295 A | 7/1991 | Schmid et al. | |
| 5,541,574 A | 7/1996 | Lowe et al. | |
| 5,583,482 A | 12/1996 | Chamussy et al. | |
| 5,717,135 A | 2/1998 | Fioretta et al. | |
| 5,731,516 A | 3/1998 | Handfield et al. | |
| 5,824,891 A | 10/1998 | Monson | |
| 5,969,239 A | 10/1999 | Tromeur et al. | |
| 6,470,933 B1 | 10/2002 | Volpi | |
| 6,830,379 B2 * | 12/2004 | Morita et al. ............... 384/448 |

* cited by examiner

*Primary Examiner*—William Oen
(74) *Attorney, Agent, or Firm*—Tarolli, Sundheim, Covell & Tummino L.L.P.

(57) ABSTRACT

A tire parameter sensing system (12) for sensing a parameter of a tire (16) includes a power transmitting antenna (44) that is actuatable for producing a magnetic field at a location of the tire (16). A rim (140) upon which the tire (16) is mounted includes first and second magnetically conductive surface portions (160 and 168) that form a drop well (156). A tire-based unit (34) is mounted in the drop well (156) so that a coil antenna (96) of the tire-based unit (34) is located adjacent to both the first and second magnetically conductive surface portions (160 and 168). The central axis of the coil antenna (96) extends in a direction parallel to the first magnetically conductive surface portion (160) and the first and second magnetically conductive surface portions (160 and 168) guide magnetic flux of the magnetic field to the coil antenna (96).

15 Claims, 4 Drawing Sheets

TIRE PARAMETER SENSING SYSTEM HAVING A MAGNETICALLY CONDUCTIVE RIM AND AN ASSOCIATED METHOD

TECHNICAL FIELD

The present invention relates to a tire parameter sensing system for a vehicle and to an associated method. More particularly, the present invention relates to a tire parameter sensing system in which a magnetically conductive rim is used for guiding magnetic flux to an antenna that provides energy to a tire-based unit. The present invention also relates to an associated method for providing energy to a tire-based unit.

BACKGROUND OF THE INVENTION

Tire parameter sensing systems for vehicles typically include a plurality of tire-based units and a single vehicle-based unit. Each tire-based unit has an associated tire of the vehicle and is operative to sense at least one parameter of the tire. The sensed parameter(s) may include temperature, pressure, etc. Each tire-based unit is also operative to transmit a parameter signal indicative of the sensed parameter(s) to the vehicle-based unit. The vehicle-based unit is connected to a display. In response to receiving a parameter signal from a tire-based unit, the vehicle-based unit outputs a signal to the display. The display is responsive to the signal for displaying the sensed tire parameter(s).

It is common for the tire-based units of a tire parameter sensing system to be battery powered. Battery powered tire-based units, however, have specific limitations, such as, for example, a limited life, a limited current supply, and a limited operating temperature range. The design of a tire parameter sensing system using battery powered tire-based units must be mindful of these limitations. As a result, it is common for a battery powered tire-based unit to transmit parameter signals only in response to a determination that a sensed parameter is outside of a desired range. For example, if the desired pressure range is 32 to 36 pounds per square inch ("psi"), the battery powered tire-based unit may transmit a parameter signal to the vehicle-based unit only when the sensed tire pressure is determined to be below 32 psi or above 36 psi. By limiting the transmissions of the parameter signal, the battery life of the battery powered tire-based unit may be extended.

In some tire parameter sensing systems, the tire-based units do not include batteries. Tire-based units that do not include batteries may receive energy through induction. When the tire-based units receive power through induction, devices for producing a magnetic field are located adjacent the tires having the tire-based units. Each tire-based unit includes an antenna in which electrical energy is induced when the antenna is placed in the magnetic field. In order for a sufficient amount of electrical energy to be induced in the antenna at all rotational positions of the tire-based unit relative to the magnetic field producing device, the antenna typically is a loop antenna that extends completely around the circumference of the tire.

U.S. Pat. No. 6,470,933 discloses a system in which a bead of a tire forms the antenna of the tire-based unit. The bead of the tire extends completely around the circumference of the tire so that electrical energy will be induced at any rotational angle of the tire relative to the vehicle.

SUMMARY OF THE INVENTION

The present invention relates to a tire parameter sensing system for sensing a parameter of a tire of a vehicle. The tire parameter sensing system comprises a power transmitting antenna that is actuatable for producing a magnetic field at a location of the tire. A rim upon which the tire is mounted has a circumferential outer surface that is contacted by the tire when the tire is mounted on the rim. At least first and second magnetically conductive surface portions of the rim form a drop well located within the outer surface. The first and second magnetically conductive surface portions are angled relative to one another. A tire-based unit senses a parameter of the tire and provides an indication of the sensed parameter. A coil antenna of the tire-based unit is responsive to the magnetic field for providing energy to the tire-based unit. The coil antenna has a central axis. The tire-based unit is mounted in the drop well of the rim so that the coil antenna is located adjacent to both the first and second magnetically conductive surface portions. The central axis of the coil antenna extends in a direction parallel to the first magnetically conductive surface portion and the first and second magnetically conductive surface portions guide magnetic flux of the magnetic field to the coil antenna.

According to another aspect, the present invention relates to a method for providing energy to a tire-based unit of a tire parameter sensing system of a vehicle. The tire-based unit is associated with a tire of the vehicle. The method comprises the steps of producing a magnetic field at a location of the tire; mounting the tire upon a rim having a circumferential outer surface that is contacted by the tire and at least first and second magnetically conductive surface portions that form a drop well in the outer surface of the rim, the first and second magnetically conductive surface portions being angled relative to one another; and mounting the tire-based unit in the drop well of the rim so that a coil antenna of the tire-based unit is located adjacent to both the first and second magnetically conductive surface portions and so that a central axis of the coil antenna extends in a direction parallel to the first magnetically conductive surface portions and the first and second magnetically conductive coil portions guide magnetic flux of the magnetic field to the coil antenna.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
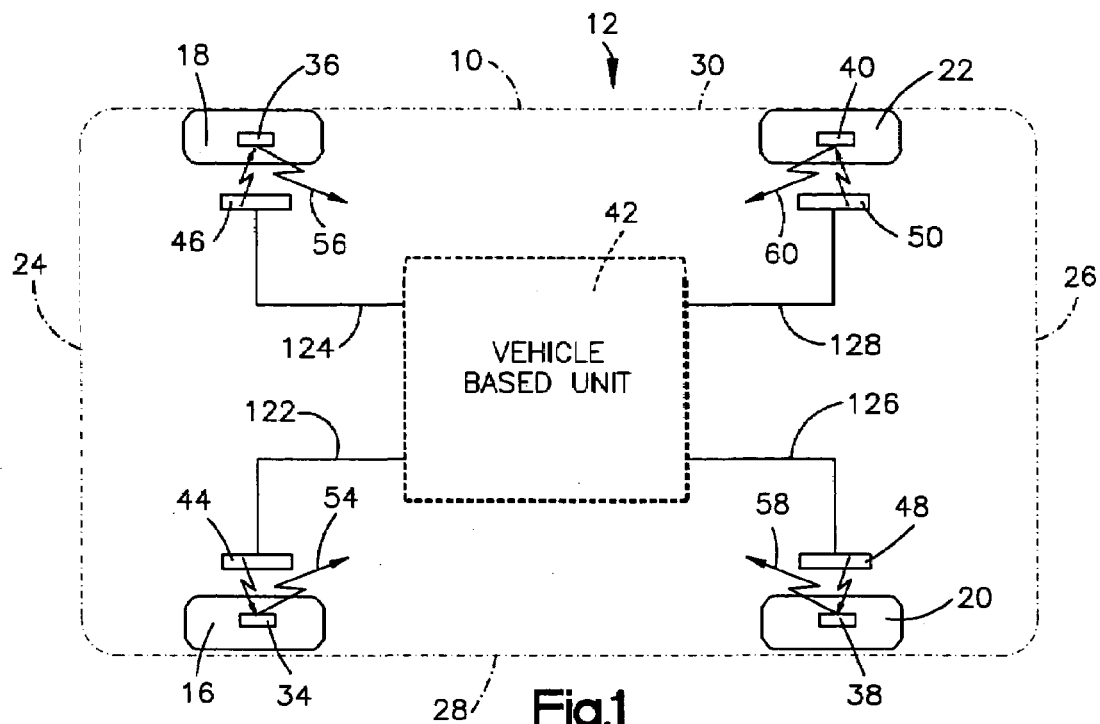
FIG. 1 schematically illustrates a vehicle including a tire parameter sensing system constructed in accordance with an exemplary embodiment of the present invention.

FIG. 1 schematically illustrates a vehicle 10 including a tire parameter sensing system 12 constructed in accordance with an exemplary embodiment of the present invention. For illustrative purposes, the vehicle 10 of FIG. 1 is an automobile having four tires 16, 18, 20, and 22. The present invention can be used with vehicles having a number of tires other than four.

The vehicle 10 has a front 24, a rear 26, and opposite left and right sides 28 and 30, respectively. FIG. 1 illustrates tire 16 at a front left corner location of the vehicle 10. Tire 18 is located at a front right corner location of the vehicle 10. Tire 20 is located at a rear left corner location of the vehicle 10 and tire 22 is located at a rear right corner location of the vehicle 10.

The tire parameter sensing system 12 includes four tire-based units 34, 36, 38, and 40, a vehicle-based unit 42, and four power transmitting antennas 44, 46, 48, and 50. Each tire 16, 18, 20, and 22 of the vehicle 10 includes an associated tire-based unit 34, 36, 38, and 40, respectively, for sensing at least one parameter, e.g., pressure, temperature, etc., of the tire and for providing a tire parameter signal 54, 56, 58, and 60, respectively, to the vehicle-based unit 42. The tire parameter signals 54, 56, 58, and 60 are indicative of the sensed parameter(s) of the tires 16, 18, 20, and 22, respectively. Preferably, the tire parameter signals 54, 56, 58, and 60 are radio frequency ("RF") signals.

Each of the tire-based unit 34, 36, 38, and 40 has an associated one of the power transmitting antennas 44, 46, 48, and 50. In the embodiment illustrated in FIG. 1, power transmitting antenna 44 is associated with tire-based unit 34, power transmitting antenna 46 is associated with tire-based unit 36, power transmitting antenna 48 is associated with tire-based unit 38, and power transmitting antenna 50 is associated with tire-based unit 40. Preferably, each of the power transmitting antennas 44, 46, 48, and 50 is located in a wheel well of the vehicle 10 adjacent the tire 16, 18, 20, or 22 having the tire-based unit 34, 36, 38, or 40 with which the power transmitting antenna is associated.

The power transmitting antennas 44, 46, 48, and 50 are operatively coupled to the vehicle-based unit 42 and are actuatable for producing magnetic fields. The power transmitting antennas 44, 46, 48, and 50 may have any known structure for producing the magnetic fields.

Figure 5:
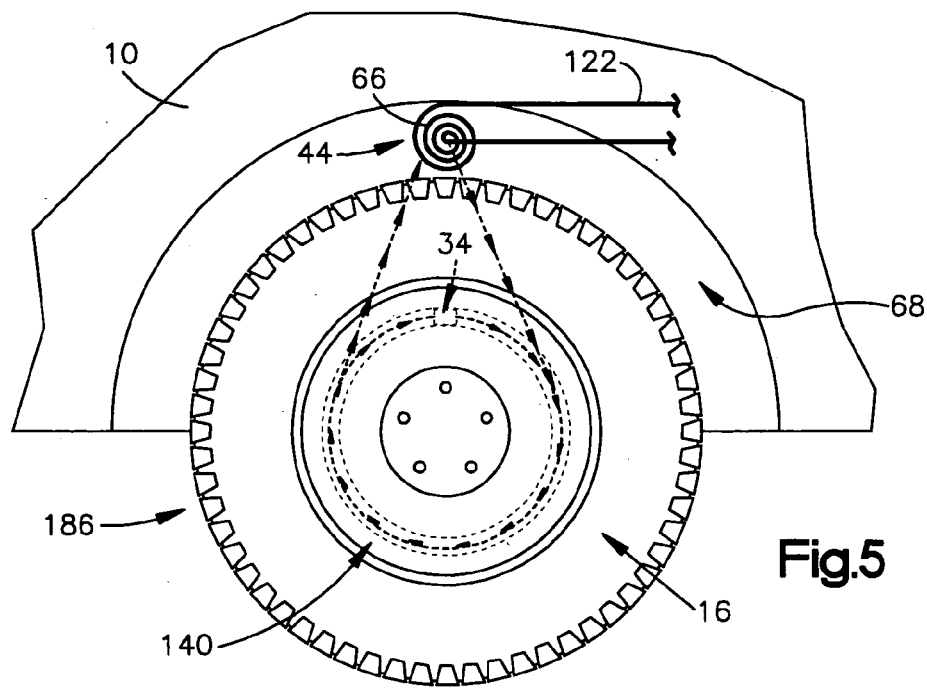
FIG. 5 schematically illustrates a portion of the tire parameter sensing system constructed in accordance with an exemplary embodiment of the present invention.

FIG. 5 illustrates an exemplary embodiment of the power transmitting antenna 44. The power transmitting antennas 46, 48, and 50 may have the same structure and operate in the same manner at power transmitting antenna 44. The power transmitting antenna 44 of FIG. 5 includes a winding 66 and an air core. The power transmitting antenna 44 is mounted in a wheel well 68 located at the front left corner location of the vehicle 10. The power transmitting antenna 44 of FIG. 5 is located in the wheel well 68 in a location that is radially outward of the tire 16. When supplied with an alternating current, the power transmitting antenna 44 provides the magnetic field, indicated generally by reference character $M_F$ in FIG. 5. Preferably, the magnetic field $M_F$ has a frequency of approximately 13 MHz.

Figure 2:
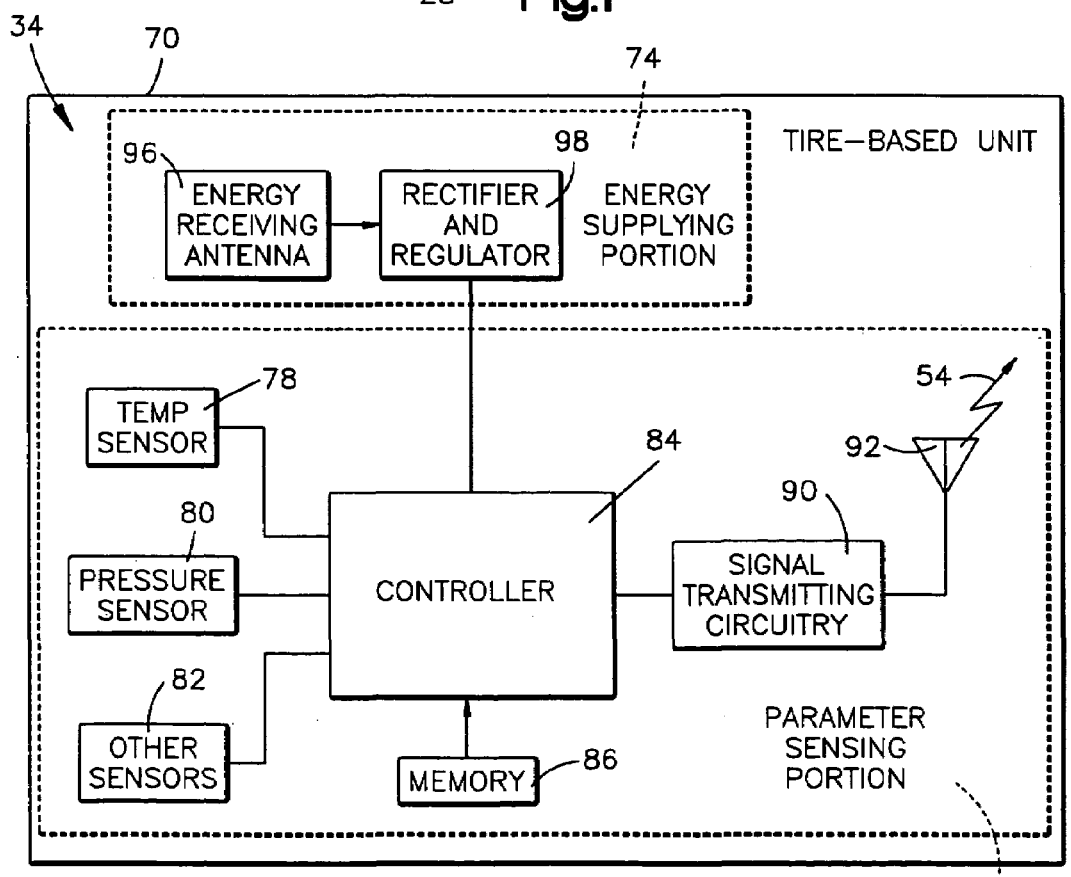
FIG. 2 is a schematic block diagram of a tire-based unit of the tire parameter sensing system of FIG. 1.

FIG. 2 is a schematic block diagram of an exemplary embodiment of a tire-based unit of the parameter sensing system 12 of FIG. 1. For purposes of example, FIG. 2 only illustrates tire-based unit 34. Tire-based units 36, 38, and 40 may have structures similar to tire-based unit 34 and may operate in a manner similar to tire-based unit 34.

The tire-based unit 34 includes a housing 70, a parameter sensing portion 72, and an energy supplying portion 74. In accordance with an exemplary embodiment of the present invention, both of the parameter sensing portion 72 and the energy supplying portion 74 are mounted to the housing 70 and the housing is open to the atmosphere of the associated tire, e.g., tire 16.

The parameter sensing portion 72 of the tire-based unit 34 includes a temperature sensor 78, a pressure sensor 80, and other sensors 82. The temperature sensor 78 is operable for sensing temperature within the associated tire 16 and providing temperature signals. The pressure sensor 80 is operable for sensing pressure within the associated tire 16 and for providing pressure signals. The other sensors 82 are operable for sensing other parameters of either the associated tire 16 or the tire-based unit 34 and for providing other parameter signals indicative of the other sensed parameters. For example, the other sensors 82 may include a voltage sensor for determining a supply voltage within the tire-based unit 34.

The parameter sensing portion 72 of the tire-based unit 34 also includes a controller 84. The controller 84 is preferably a microcomputer. Alternatively, the controller 84 may be formed from discrete circuitry, an application-specific-integrated-circuit ("ASIC"), or any other type of control circuitry. The controller 84 is operatively coupled to the temperature sensor 78, the pressure sensor 80, and the other sensors 82 and receives the temperature signals, the pressure signals, and the other parameter signals. The controller 84 performs a tire parameter sensing algorithm and outputs a message packet that includes information indicative of one or more of the sensed temperature, pressure, and other parameters. Any known tire parameter sensing algorithm may be used with the present invention.

A memory 86 is operatively coupled to the controller 84. Alternatively, the memory 86 may form a portion of the controller 84. The memory 86 is a non-volatile memory. The tire parameter sensing algorithm is stored in the memory 86. The memory 86 also stores an identification code for identifying the tire-based unit 34. Each tire-based unit 34, 36, 38, and 40 has a unique associated identification code. The controller 84 includes the identification code in the output message packet.

The parameter sensing portion 72 of the tire-based unit 34 also includes signal transmitting circuitry 90. The signal transmitting circuitry 90 is operatively coupled to the controller 84 and includes circuitry, such as a radio frequency ("RF") amplifier (not shown) and other known circuitry, for transmitting the parameter signal 54 via a transmitting antenna 92. The signal transmitting circuitry 90 receives message packets from the controller 84 and transmits the message packets in the tire parameter signals 54. The message packets are modulated onto a constant frequency carrier signal using known modulation techniques, such as, for example, amplitude shift keying ("ASK"). Other signal modulation techniques, such as frequency shift keying, phase shift keying, etc., are also contemplated by the present invention.

Figure 6:
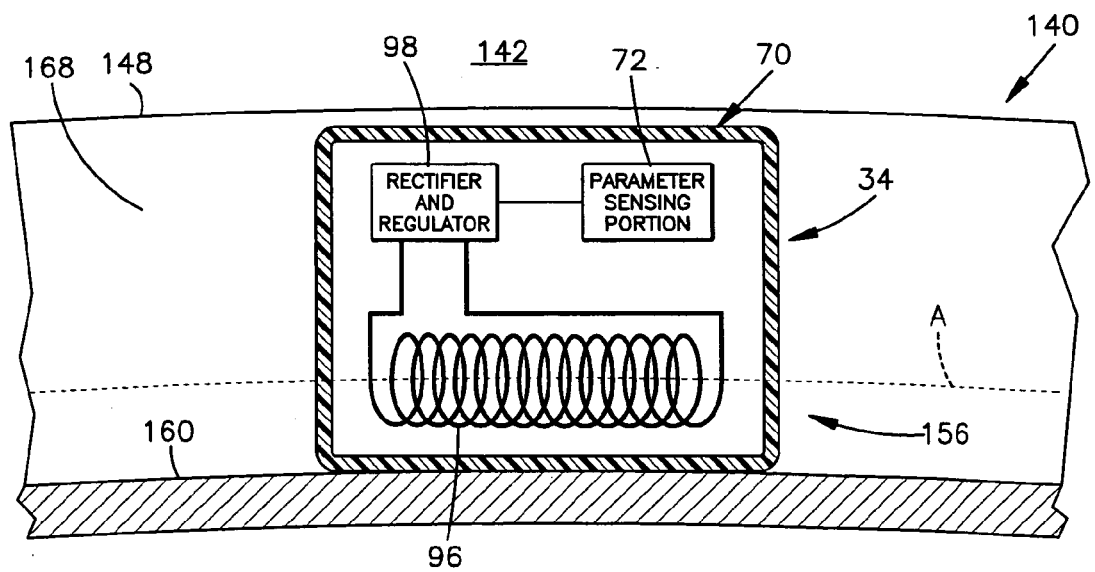
FIG. 6 is an enlarged sectional view of a portion of the tire-based unit of FIG. 5.

The energy supplying portion 74 of the tire-based unit 34 includes an energy receiving antenna 96 and rectifying and regulating circuitry 98. The energy receiving antenna 96 is a coil, as is shown in FIG. 6. Electrical energy, i.e., a voltage and a current, is induced in the energy receiving antenna 96 when the antenna is placed within a magnetic field $M_F$. The magnetic field $M_F$ is produced by alternating current. The polarity of the magnetic field $M_F$ alternates with the polarity of the alternating current. As a result, the electrical energy induced in the energy receiving antenna 96 also has an alternating current.

The rectifying and regulating circuitry 98 receives the electric energy from the energy receiving antenna 96, converts the alternating current of the received electrical energy into direct current, and outputs electrical energy having a regulated direct current. The rectifying and regulating circuitry 98 provides the rectified and regulated electrical energy to an energy storage device (not shown), such as a capacitor, which provides the electrical energy to the controller 84 of the parameter sensing portion 72 of the tire-based unit 34.

Figure 3:
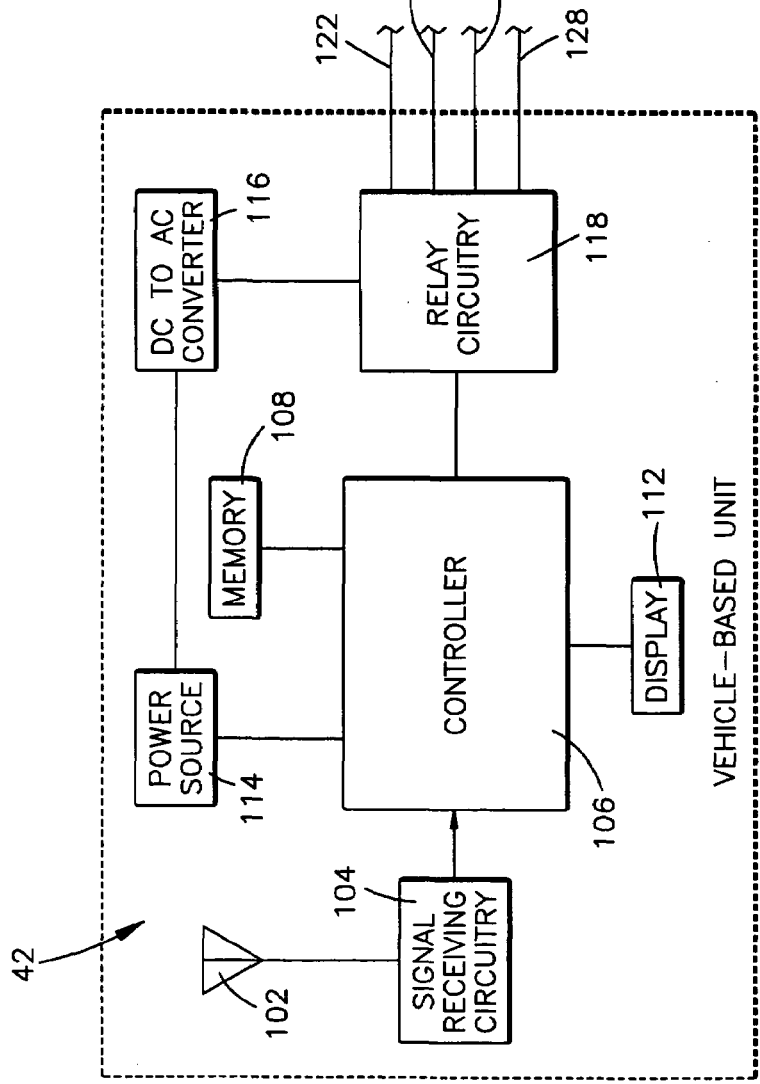
FIG. 3 is a schematic block diagram of a vehicle-based unit of the tire parameter sensing system of FIG. 1.

FIG. 3 is a schematic block diagram of an exemplary embodiment of the vehicle-based unit 42 of the tire parameter sensing system 12 of FIG. 1. The vehicle-based unit 42 includes a receiving antenna 102 that is coupled to signal receiving circuitry 104. The signal receiving circuitry 104 receives tire parameter signals, e.g., parameter signal 54 (FIG. 1), from the receiving antenna 102. The signal receiving circuitry 104 includes signal conditioning circuitry (not shown), such as filters, amplifiers, etc. The signal receiving circuitry 104 also includes signal demodulating circuitry (not shown) for demodulating the received tire parameter signals and for outputting message packets received in the tire parameter signals to a controller 106 of the vehicle-based unit 42.

The controller 106 of the vehicle-based unit 42 is preferably a microcomputer. Alternatively, the controller 106 may be formed from discrete circuitry, an application-specific-integrated-circuit ("ASIC"), or any other type of control circuitry. The controller 106 also performs a tire parameter sensing algorithm.

The controller 106, upon receiving a message packet from the signal receiving circuitry 104, determines whether the message packet originated in one of the tire-based units 34, 36, 38, or 40 (FIG. 1) of the tire parameter sensing system 12. To determine whether the message packet originated in one of the tire-based units 34, 36, 38, or 40, the controller 106 compares the identification code received in the message packet to identification codes stored in a memory 108 associated with the controller 106. The memory 108 is a non-volatile memory that includes a lookup table having the identification codes of the tire-based units 34, 36, 38, and 40 of the tire parameter sensing system 12. The lookup table may also include associated location information for each tire-based unit 34, 36, 38, and 40. For example, the look-up table stored in memory 108 may associate the identification code of tire-based unit 34 with the front left corner location of the vehicle 10.

When the controller 106 determines that the received message packet did not originate from one of the tire-based units 34, 36, 38, or 40, the controller 106 ignores the message packet. When the controller 106 determines that the received message packet did originate from one of the tire-based units 34, 36, 38, or 40, the controller 106 analyzes the tire parameter information received in the message packet, i.e., the information indicating the temperature, the pressure, and/or the other sensed parameters.

The controller 106, after analyzing the tire parameter information received in the message packet, outputs display signals to a display 112. The display 112 is located in the occupant compartment of the vehicle 10 and is operatively coupled to the controller 106. The display 112 is responsive to receipt of display signals for providing an indication of the tire parameter information and, optionally, the associated corner location. For example, the display 54 may provide an indication of sensed tire temperatures and sensed tire pressures for each of the tires 16, 18, 20, and 22.

The vehicle-based unit 42 also includes a power source 114. The power source 114 of the vehicle-based unit 42 provides electrical power to the controller 106 for powering the vehicle-based unit. The power source 114 preferably includes the battery of the vehicle 10 and an appropriate voltage regulator (not shown).

The power source 114 is also connected to a direct current ("DC") to alternating current ("AC") converter 116, such as an oscillator. The DC to AC converter 116 outputs electrical energy having an alternating current to relay circuitry 118. The relay circuitry 118 includes four relay switches (not shown) and is also operatively connected to the controller 106. The controller 106 controls the opening and closing of the four relay switches of the relay circuitry 118.

Output wires 122, 124, 126, and 128 connect the relay circuitry 118 to the power transmitting antennas 44, 46, 48, and 50, as is shown in FIG. 1. FIGS. 1 and 3 schematically illustrate the output wires 122, 124, 126, and 128. Those skilled in the art will appreciate that these are wire pairs. FIG. 5 illustrates output wire 122 forming the winding 66 of the power transmitting antenna 44.

Each output wire 122, 124, 126, and 128 has an associated relay switch of the relay circuitry 118. When the controller 106 controls the relay circuitry 118 to close a relay switch, electrical energy having an alternating current is supplied to the power transmitting antenna 44, 46, 48, or 50 that is associated with the closed relay switch. The power transmitting antennas 44, 46, 48, and 50 are responsive to the alternating current for producing magnetic fields.

As an alternative to the embodiment illustrated in FIG. 3, the relay circuitry 118 may receive electrical energy having a direct current and multiple DC to AC converters may be located in series with the output wires 122, 124, 126, and 128 for converting the alternating current to direct current. The multiple DC to AC converters may be located either at the vehicle-based unit 42 or remote from the vehicle-base unit, such as near the power transmitting antennas 44, 46, 48, and 50.

Figure 4:
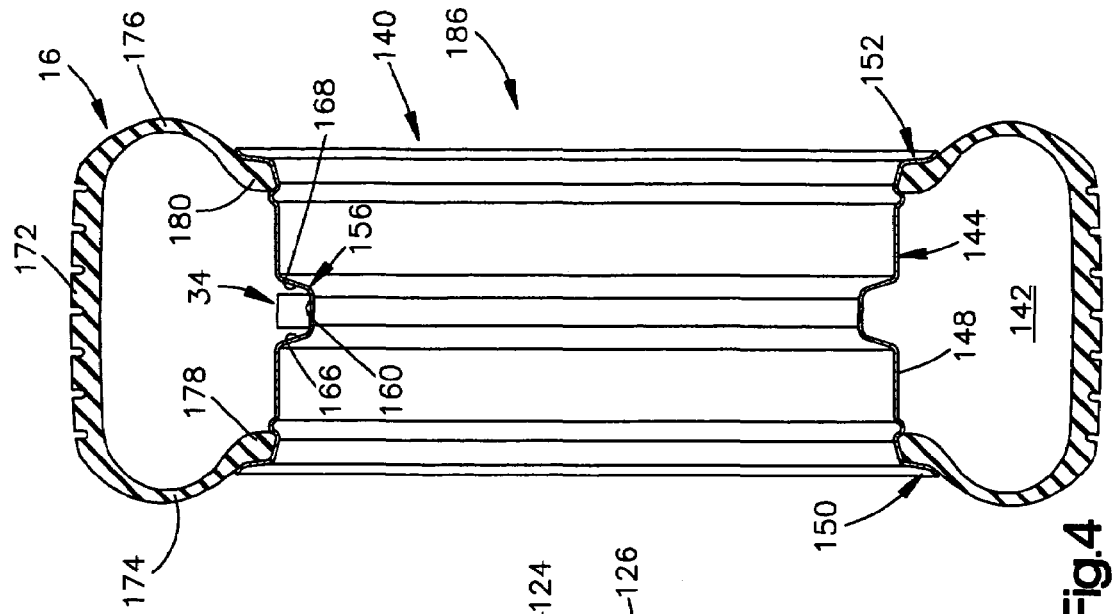
FIG. 4 is a cross-sectional view of a wheel assembly having a tire-based unit mounted to a rim of the wheel assembly in accordance with an exemplary embodiment of the present invention.

FIG. 4 is a cross-sectional view of tire 16 mounted to a rim 140. The tire-based unit 34 is mounted to a rim 140 and within a cavity 142 of tire 16. For brevity, the mounting of only tire-based unit 34 is discussed in detail below. Tire-based units 36, 38, and 40 may have similar mounting conditions on similar rims that are associated with tires 18, 20, and 22, respectively.

The rim 140 is formed from a magnetically conductive material, preferably, a metal. The rim 140 includes an annular base wall 144 having an outer surface 148. Inner and outer bead flanges 150 and 152 are located on opposite sides of the base wall 144. A drop well 156 extends into the base wall 144 from the outer surface 148. The drop well 156 extends circumferentially around the rim 140 and includes a lower surface 160 and opposite side surfaces 166 and 168. Each of the lower surface 160 and the side surfaces 166 and 168 is also magnetically conductive. A depth of the drop well 156, which is defined as the radial distance between the outer surface 148 of the base wall 144 and the lower surface 160, is greater than a height of the housing 70 of the tire-based unit 34, as is shown in FIG. 6.

The tire 16 includes a tread portion 172 and opposite side walls 174 and 176. The side walls 174 and 176 of the tire 16 terminate at ends opposite the tread portion 172 with bead portions 178 and 180, respectively. When the tire 16 is mounted on the rim 140, bead portion 178 seats in bead flange 150 and bead portion 180 seats in bead flange 152. Also, when the tire 16 is mounted on the rim 140, ends of the bead portions 178 and 180 contact the outer surface 148 of base wall 144 of the rim 140. The tire 16 and the rim 140 collectively form a wheel assembly 186.

FIG. 5 illustrates the wheel assembly 186, which includes tire 16 and rim 140, mounted to the vehicle 10 in the wheel well 68. As FIG. 5 illustrates, the power transmitting antenna 44 is also located in wheel well 68 in a location adjacent the wheel assembly 186 and radially outward of the rim 140 and the tire 16. When actuated by the controller 106 of the vehicle-based unit 42, the power transmitting antenna 44 produces the magnetic field $M_F$. In an exemplary embodiment of the invention, a central axis of the winding 66 of the power transmitting antenna 44 is normal to the axis of the rim 140 and pointing generally toward the center of the rim 140.

When the magnetically conductive rim 140 is placed in the magnetic field $M_F$, the rim 140 alters the path of the magnetic flux of the magnetic field $M_F$, as compared to when the wheel well 68 is empty. When the rim 140 is placed in the magnetic field $M_F$, the magnetically conductive surfaces of the rim 140 act to guide the magnetic flux of the magnetic field $M_F$ on the surfaces of the rim. The magnetic flux of the magnetic field $M_F$ becomes concentrated on the outer surface 148 of the base wall 144 of the rim 140 and on the surfaces 160, 166, and 168 of the drop well 156 of the rim. In the embodiment illustrated in FIG. 5, a path of the magnetic flux extends circumferentially around the rim 140. The arrows of FIG. 5 illustrate the path of the magnetic flux of the magnetic field $M_F$ around the circumference of the rim 140. The path of the magnetic flux extends around the rim 140 in a direction tangential to the outer surface 148 of the base wall 144 and tangential to the lower surface 160 of the drop well 156.

In accordance with the present invention, the tire-based unit 34 is mounted in the drop well 156 of the rim 140 in a location adjacent at least one of the side surfaces 166 and 168 of the drop well. When the tire-based unit 34 is mounted in the drop well 156, the energy receiving antenna 96 is located adjacent the lower surface 160 and at least one of the side surfaces 166 and 168 of the drop well 156. In the embodiment illustrated in FIGS. 6 and 7, the energy receiving antenna 96 is located adjacent the lower surface 160 and side surface 168 of the drop well 156. Since the magnetic flux is most concentrated on the metal surfaces of the rim 140, the energy receiving antenna 96 should be positioned as near the surfaces as possible, while remaining electrically insulated from the metal surfaces of the rim.

Figure 7:
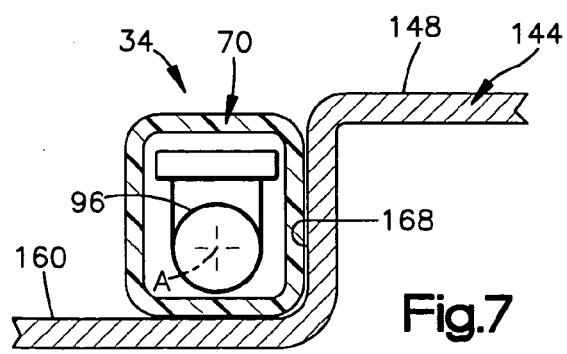
FIG. 7 is an enlarged sectional view of a portion of the tire-based unit of FIG. 5.

The energy receiving antenna 96 is a coil that is wound about a central axis A, as shown in FIGS. 6 and 7. In an exemplary embodiment of the present invention, the axis A of the energy receiving antenna 96 extends in a direction parallel to the outer surface 148 of the base wall 144 of the rim 140, in a direction parallel to the lower surface 160 of the drop well, and in a direction parallel to the path of the magnetic flux relative to the rim 140. In the embodiment illustrated in FIGS. 6 and 7, the axis A of the energy receiving antenna 96 also extends in a direction parallel to side surface 168 of the drop well 156 of the rim 140.

The electrical energy induced in the energy receiving antenna 96 is proportional to the concentration of the magnetic flux passing through the antenna. As set forth above, when the magnetically conductive rim 140 is placed in the magnetic field $M_F$, the magnetic flux becomes concentrated on the surfaces 148, 160, 166, and 168 of the rim 140. By mounting the tire-based unit 34 in the drop well 156 so that the energy receiving antenna 96 is adjacent to the lower surface 160 and at least one of the side surfaces 166 and 168 of the drop well 156, magnetic flux is guided to the energy receiving antenna 96. When the energy receiving antenna 96 is positioned adjacent to and parallel with two of the surfaces, e.g., surfaces 160 and 168 as shown in FIGS. 6 and 7, magnetic flux will be guided through the entire length of the energy receiving antenna 96. As a result, a sufficiently large amount of electrical energy for powering the tire-based unit 34 is induced in the energy receiving antenna 96.

Figure 8:
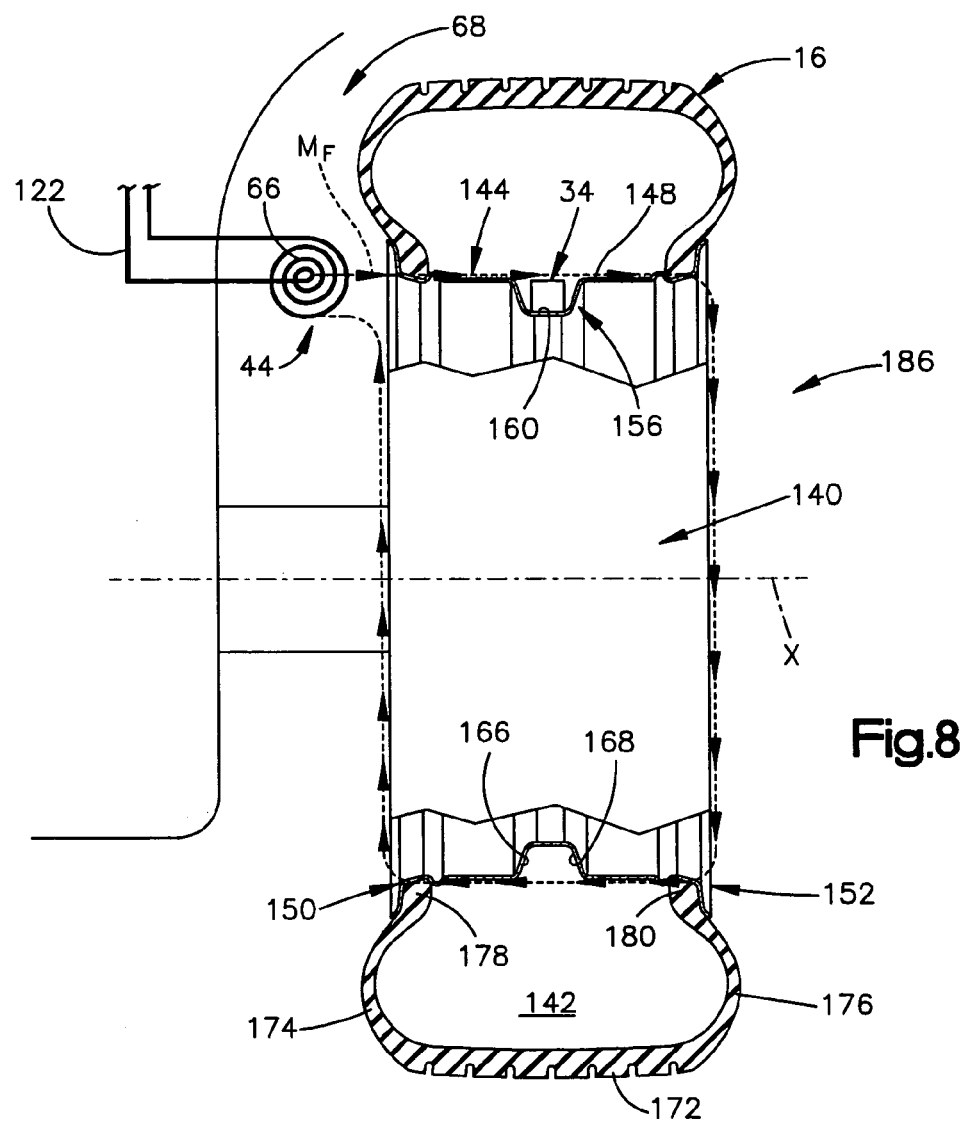
FIG. 8 schematically illustrates a portion of the tire parameter sensing system constructed in accordance with a second exemplary embodiment of the present invention.

FIG. 8 schematically illustrates a portion of the tire parameter sensing system constructed in accordance with a second exemplary embodiment of the present invention. The structures of FIG. 8 that are the same or similar to those shown and discussed with reference to FIGS. 1–7 are labeled with the same reference numbers.

FIG. 8 illustrates the power transmitting antenna 44 in the wheel well 68 located at the front left corner location of the vehicle 10. The power transmitting antenna 44 includes a winding 66 and an air core. The power transmitting antenna 44 is mounted in the wheel well 68 at a location axially adjacent to the rim 140, relative to an axis X of the rim 140. Preferably, the winding 66 of the power transmitting antenna 44 is positioned relative to the rim 140 so that a central axis of the winding 66 extends across the rim 140 in a direction parallel to the axis X of the rim. When supplied with an alternating current, the power transmitting antenna 44 provides the magnetic field, indicated generally by reference character $M_F$.

FIG. 8 also illustrates a cross-sectional view of tire 16 mounted to a rim 140. The tire-based unit 34 is mounted to in a drop well 156 of the rim 140. The rim 140 is formed from a magnetically conductive material, preferably, a metal.

Figure 9:
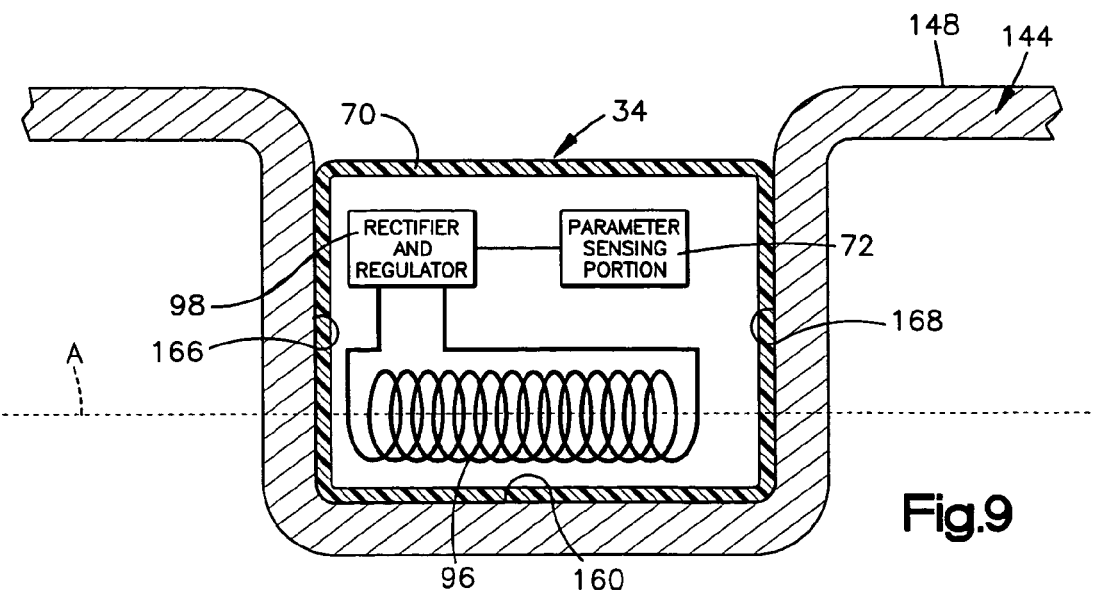
FIG. 9 is an enlarged sectional view of a portion of the tire-based unit of FIG. 8.

When the magnetically conductive rim 140 is placed in the magnetic field $M_F$, the rim 140 alters the path of the magnetic flux of the magnetic field $M_F$, as compared to when the wheel well 68 is empty. When the rim 140 is placed in the magnetic field $M_F$, the rim 140 acts as a field guide for the magnetic flux of the magnetic field $M_F$. The arrows of FIGS. 8 and 9 illustrate the path of the magnetic flux of the magnetic field $M_F$ when the power transmitting antenna 44 is located axially adjacent to the rim 140, as is shown in FIG. 8. As illustrated in FIG. 8, the path of the magnetic flux extends across the surfaces 148, 160, 166, and 168 of the rim 140 in a direction generally perpendicular to the circumference of the rim 140.

In accordance with the present invention, the tire-based unit 34 is mounted in the drop well 156 of the rim 140 so that the central axis A of the energy receiving antenna 96 extends parallel to the path of the magnetic flux across the surfaces 148, 160, 166, and 168 of the rim 140. The tire-based unit 34 is also mounted in the drop well 156 so that the energy receiving antenna 96 is located adjacent the lower surface 160 of the drop well 156 and at least one of the side surfaces 166 and 168 of the drop well. FIG. 9 illustrates the tire-based unit 34 mounted in the drop well 156 so that the energy receiving antenna 96 is adjacent to the lower surface 160 of the drop well and side surface 166. In FIG. 9, an end of the energy receiving antenna 96 is adjacent side surface 166 of the drop well 156. In the embodiment illustrated in FIG. 9, the central axis A of the energy receiving antenna 96 extends across the rim 140 in a direction parallel to axis X (FIG. 8). When the energy receiving antenna 96 is positioned adjacent to the two surfaces 160 and 166 of the drop well 156, and particularly, when the energy receiving antenna 96 extends in a direction parallel to the lower surface 160 of the drop well and in a direction parallel to the path of the magnetic flux on the rim 140, the magnetic flux of the magnetic field $M_F$ is guided to the energy receiving antenna 96. The electrical energy induced in the energy receiving antenna 96 is proportional to the concentration of the magnetic flux passing through the antenna. Positioning the energy receiving antenna 44 as illustrated in FIG. 9 enables a sufficiently large amount of electrical energy for powering the tire-based unit 34 to be induced in the energy receiving antenna 96.

From the above description of the invention, those skilled in the art will perceive improvements, changes and modifications. Such improvements, changes and modifications within the skill of the art are intended to be covered by the appended claims.

Having described the invention, we claim the following:

1. A tire parameter sensing system for sensing a parameter of a tire of a vehicle, the tire parameter sensing system comprising:

a power transmitting antenna that is actuatable for producing a magnetic field at a location of the tire;

a rim upon which the tire is mounted, the rim having a circumferential outer surface that is contacted by the tire when the tire is mounted on the rim, at least first and second magnetically conductive surface portions of the rim forming a drop well located within the outer surface, the first and second magnetically conductive surface portions being angled relative to one another; and a tire-based unit for sensing a parameter of the tire and for providing an indication of the sensed parameter, a coil antenna of the tire-based unit being responsive to the magnetic field for providing energy to the tire-based unit, the coil antenna having a central axis, the tire-based unit being mounted in the drop well of the rim so that the coil antenna is located adjacent to both the first and second magnetically conductive surface portions, the central axis of the coil antenna extending in a direction parallel to the first magnetically conductive surface portion and the first and second magnetically conductive surface portions guiding magnetic flux of the magnetic field to the coil antenna.

2. The tire parameter sensing system of claim 1 wherein the central axis of the coil antenna also extends in a direction parallel to the second magnetically conductive surface portion of the rim.

3. The tire parameter sensing system of claim 2 wherein the power transmitting antenna is oriented relative to the rim so that the magnetic flux of the magnetic field travels circumferentially around the rim in a direction parallel to the central axis of the coil antenna.

4. The tire parameter sensing system of claim 1 wherein the coil antenna is located immediately adjacent a union that connects the first and second magnetically conductive surface portions.

5. The tire parameter sensing system of claim 1 wherein the outer surface of the rim is an annular, radially outer surface of the rim and wherein the drop well extends radially inwardly, relative to an axis of the rim, from the outer surface.

6. The tire parameter sensing system of claim 1 wherein the tire-based unit in its entirety is located in the drop well and below the outer surface of the rim.

7. The tire parameter sensing system of claim 1 wherein the second magnetically conductive surface portion is located adjacent an end of the coil antenna, the coil antenna extending in a direction perpendicular to a circumference of the rim.

8. The tire parameter sensing system of claim 7 wherein the power transmitting antenna is oriented relative to the rim so that the magnetic flux of the magnetic field travels over the outer surface of the rim in a direction parallel to an axis of the rim and parallel to an axis of the coil antenna.

9. The tire parameter sensing system of claim 1 further including a vehicle-based unit that is operatively connected to a display, the indication of the sensed parameter that is provided by the tire-based unit being a tire parameter signal that is received by the vehicle-based unit, the vehicle-based unit, in response to receiving the tire parameter signal, actuating the display so as to provide an indication of the sense parameter.

10. A method for providing energy to a tire-based unit of a tire parameter sensing system of a vehicle, the tire-based unit being associated with a tire of the vehicle, the method comprising the steps of:

producing a magnetic field at a location of the tire;

mounting the tire upon a rim having a circumferential outer surface that is contacted by the tire and at least first and second magnetically conductive surface portions that form a drop well in the outer surface of the rim, the first and second magnetically conductive surface portions being angled relative to one another; and mounting the tire-based unit in the drop well of the rim so that a coil antenna of the tire-based unit is located adjacent to both the first and second magnetically conductive surface portions and so that a central axis of the coil antenna extends in a direction parallel to the first magnetically conductive surface portions and the first and second magnetically conductive coil portions guide magnetic flux of the magnetic field to the coil antenna.

11. The method of claim 10 wherein the step of mounting the tire-based unit in the drop well of the rim further includes the step of:

mounting the tire-based unit so that the central axis of the coil antenna also extends in a direction parallel to the second magnetically conductive surface portion of the rim.

12. The method of claim 11 further including the step of:

orienting the power transmitting antenna relative to the rim so that the magnetic flux of the magnetic field travels circumferentially around the rim in a direction parallel to the central axis of the coil antenna.

13. The method of claim 10 wherein the step of mounting the tire-based unit in the drop well of the rim further includes the step of:

mounting the tire-based unit so that the coil antenna is immediately adjacent a union of the first and second magnetically conductive surface portions.

14. The method of claim 10 wherein the step of mounting the tire-based unit in the drop well of the rim further includes the step of:

mounting the tire-based unit so that the second magnetically conductive surface portion is located adjacent an end of the coil antenna, the coil antenna extending in a direction perpendicular to a circumference of the rim.

15. The method of claim 14 further including the step of:

orienting the power transmitting antenna relative to the rim so that the magnetic flux of the magnetic field travels over the outer surface of the rim in a direction parallel to an axis of the rim and parallel to an axis of the coil antenna.

* * * * *